United States Patent
Goto et al.

(10) Patent No.: US 9,946,613 B2
(45) Date of Patent: Apr. 17, 2018

(54) INSTRUMENTATION SYSTEM AND METHOD FOR MAINTAINING THE SAME

(71) Applicant: YOKOGAWA ELECTRIC CORPORATION, Musashino-shi, Tokyo (JP)

(72) Inventors: Masahisa Goto, Tokyo (JP); Tatsuzou Sakuramoto, Tokyo (JP); Koji Nagatomi, Tokyo (JP); Hiroaki Higuchi, Tokyo (JP); Ryuichiro Hoshina, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 150 days.

(21) Appl. No.: 14/593,220

(22) Filed: Jan. 9, 2015

(65) Prior Publication Data

US 2015/0199245 A1    Jul. 16, 2015

(30) Foreign Application Priority Data

Jan. 14, 2014 (JP) .................................. 2014-004367

(51) Int. Cl.
 *G06F 11/00* (2006.01)
 *G06F 11/20* (2006.01)
 (Continued)

(52) U.S. Cl.
 CPC ........ *G06F 11/2007* (2013.01); *G05B 19/054* (2013.01); *G05B 19/414* (2013.01);
 (Continued)

(58) Field of Classification Search
 None
 See application file for complete search history.

(56) References Cited

U.S. PATENT DOCUMENTS 5,136,498 A * 8/1992 McLaughlin ....... G06F 11/2097
                                                            700/3
5,142,470 A    8/1992 Bristow et al.
(Continued)

FOREIGN PATENT DOCUMENTS

EP    2211268 A1    7/2010
EP    2682829 A2    1/2014
(Continued)

OTHER PUBLICATIONS

Allan Rentcome: "Process Safety & Critical Control—Rockwell Automation Process Safety Platforms", Dec. 31, 2012 (Dec. 31, 2012), pp. 1-29.

(Continued)

*Primary Examiner* — Loan L. T. Truong
(74) *Attorney, Agent, or Firm* — Sughrue Mion, PLLC (57) ABSTRACT

An instrumentation system according to one embodiment of the present invention includes a plurality of field devices, in which each of the field devices is configured to perform at least one of measuring and operation of a target, a connection device including a plurality of slots, in which I/O modules are respectively attachable to the slots and the field devices are connectable to the I/O module, and a host control device configured to individually set the I/O modules attached to the slots to have a redundant configuration or a non-redundant configuration and to operate a first I/O module having the non-redundant configuration, among the I/O modules attached to the slots, in a pseudo redundant configuration.

17 Claims, 8 Drawing Sheets

(51) Int. Cl.
*G05B 19/414* (2006.01)
*G05B 19/05* (2006.01)

(52) U.S. Cl.
CPC ............... *G06F 11/2017* (2013.01); *G05B 2219/14125* (2013.01); *G05B 2219/14128* (2013.01)

(56) References Cited

U.S. PATENT DOCUMENTS

| | | | | |
|---|---|---|---|---|
| 5,922,077 | A * | 7/1999 | Espy | G06F 11/201 714/4.12 |
| 6,748,477 | B1 * | 6/2004 | Benson | G06F 3/0607 710/305 |
| 6,822,874 | B1 * | 11/2004 | Marler | H05K 7/1452 361/724 |
| 7,238,030 | B2 * | 7/2007 | Sullivan | G06F 13/409 361/785 |
| 8,392,626 | B2 | 3/2013 | Wormmeester et al. | |
| 2002/0184410 | A1 * | 12/2002 | Apel | G06F 9/4411 710/5 |
| 2003/0059031 | A1 * | 3/2003 | Pike | H04M 3/005 379/325 |
| 2004/0255187 | A1 * | 12/2004 | Gabriel Vecoven | G06F 11/0724 714/6.31 |
| 2006/0059389 | A1 | 3/2006 | Hatamori | |
| 2006/0112222 | A1 * | 5/2006 | Barrall | G06F 3/0607 711/114 |
| 2006/0236082 | A1 * | 10/2006 | Horimoto | G06F 15/177 713/1 |
| 2007/0205822 | A1 * | 9/2007 | Jovanovich | G06F 11/2005 327/526 |
| 2009/0016009 | A1 * | 1/2009 | Barrall | G06F 1/187 361/679.31 |
| 2010/0204806 | A1 * | 8/2010 | Chowaniec | G05B 19/054 700/19 |
| 2012/0198115 | A1 * | 8/2012 | Cho | G06F 3/061 710/301 |
| 2014/0115236 | A1 * | 4/2014 | Wu | G06F 11/2046 711/103 |
| 2015/0039786 | A1 * | 2/2015 | Martin | G06F 13/122 710/8 |

FOREIGN PATENT DOCUMENTS

| | | |
|---|---|---|
| JP | 511820 A | 1/1993 |
| JP | 200184009 A | 3/2001 |
| JP | 2001-100816 A | 4/2001 |

OTHER PUBLICATIONS

"Maintaining Data Integrity across Redundant I/O Device Take-Overs", IBM Technical Disclosure Bulletin, International Business Machines Corp. (Thornwood), US, vol. 36, No. 6A, Jun. 1, 1993 (Jun. 1, 1993), pp. 577-578.

"Redundant System Basic Concepts", Jan. 11, 2008 (Jan. 11, 2008) total number of pp. 5.

* cited by examiner

INSTRUMENTATION SYSTEM AND METHOD FOR MAINTAINING THE SAME

BACKGROUND OF THE INVENTION

Field of the Invention

The present invention relates to an instrumentation system and a method for maintaining the instrumentation system.

Priority is claimed on Japanese Patent Application No. 2014-004367, filed Jan. 14, 2014, the contents of which are incorporated herein by reference.

Description of Related Art

An instrumentation system, which has been built in a plant or a factory or the like, generally has a configuration that on-site devices called field devices (measuring devices, and actuators), a controller for controlling the operations of field devices, and a host device for managing and controlling the field devices and the controller are connected to one another via communication means. In such instrumentation system, the controller collects process values (for example, measured values such as pressure, temperature, flow rate) obtained by the field devices, and controls the field devices based on the collected process values under the management of the host device.

There are various field devices used for the instrumentation system depending on measuring targets and operation targets. The form of signals input to and output from the field devices also varies. For example, there are a field device for performing input and output of an analog signal, which is "4 to 20 mA" and the like, a field device for performing input and output of a digital signal, which is "24V", a field device for performing output of a thermocouple signal, and a field device for performing input and output of a contact signal. Therefore, generally, the field device is connected to the controller via an I/O module for performing a signal conversion and a protocol conversion.

The above-described I/O module is roughly classified into one, which is connected to a field device in one-on-one relationship (one-point type), and one having a plurality of channels, each of which a field device is connectable to (multipoint type). Since the one-point type I/O module is connected to the filed device in one-on-one relationship, the maintenance is easy. However, since the large installation location (footprint) is required, the manufacturing cost increases. On the other hand, since the multipoint type I/O module is one, to which the plurality of I/O modules are connectable, the installation location and the manufacturing cost can be reduced. However, there are some cases where the maintenance becomes difficult.

Japanese Patent Application Laid-Open Publication No. 2001-100816 (hereinafter, referred to as "Patent document 1") discloses an example of I/O module in the related art. Specifically, when the I/O module disclosed in Patent document 1 is used, the I/O module is duplicated (redundant) in order to reduce the influence of stop due to the failure. Thus, even if one I/O module fails, the operation (the operation of control loop) is continued by the other I/O module. Therefore, the reliability can be improved by making the I/O module redundant.

The above-described I/O module can be used in the redundant configuration (redundant configuration) as disclosed in Patent document 1, or in a non-redundant configuration (non-redundant configuration: single configuration). As the configuration of I/O module, one of the redundant configuration and the single configuration is selected in consideration of the extent of influence on the process due to the failure of the I/O module.

When the I/O modules having the redundant configuration are used and one I/O module fails, the operation is continued by the other I/O module in either the one-point I/O module or the multiple points I/O module. Therefore, unless both I/O modules in the redundant configuration are failed simultaneously, it is considered that the availability ratio of the whole instrumentation system does not significantly decrease.

However, when the multipoint type I/O module having a single configuration is used and the I/O module fails, it is necessary to replace the failed I/O module. Thus, even if the I/O module of only one channel fails, it is necessary to stop the operation of control loop via a normal channel. Therefore, there are some cases where the availability ratio of the whole instrumentation system decreases.

When the multipoint type I/O module having a single configuration is replaced, it is necessary to perform a prior work for preliminarily determining whether the process is adversely affected by stopping the operation of control loop via a normal channel, which does not fail, or what is a work required to prevent the diffusion of the adverse influence, or the like. Thus, when the I/O module is replaced, the above-described prior work is required. Therefore, there are some cases where the maintainability decreases.

SUMMARY OF THE INVENTION

One aspect of the present invention provides an instrumentation system, which can prevent the decrease of the availability ratio and the maintainability even if a multipoint type I/O module having a non-redundant configuration is used, and a method for maintaining the instrumentation system.

An instrumentation system according to one embodiment of the present invention may include a plurality of field devices, in which each of the field devices is configured to perform at least one of measuring and operation of a target, a connection device including a plurality of slots, in which I/O modules are respectively attachable to the slots and the field devices are connectable to the I/O module, and a host control device configured to individually set the I/O modules attached to the slots to have a redundant configuration or a non-redundant configuration and to operate a first I/O module having the non-redundant configuration, among the I/O modules attached to the slots, in a pseudo redundant configuration.

In the instrumentation system described above, when the first I/O module is required to be replaced, the first I/O module may be made redundant by newly attaching a second I/O module to the slot.

In the instrumentation system described above, when the first I/O module is made redundant, the host control device may be configured to transfer a control right of the first I/O module to the second I/O module.

In the instrumentation system described above, before the host control device transfers the control right of the first I/O module to the second I/O module, the host control device may be configured to set the second I/O module to have a similar function to a function of the first I/O module.

In the instrumentation system described above, when the first I/O module is required to be replaced, the host control device may be configured to operate the first I/O module required to be replaced in the pseudo redundant configuration.

In the instrumentation system described above, the host control device may include a host device configured to individually set the I/O modules attached to the slots to have the redundant configuration or the non-redundant configuration, and a control device configure to control the field devices and to operate the first I/O module set to have the non-redundant configuration by the host device, among the I/O modules attached to the slots, in the pseudo redundant configuration.

In the instrumentation system described above, the control device may be configured to mask normality information. The normality information may be transmitted from the first I/O module to the host device and indicate abnormality.

In the instrumentation system described above, the connection device and the control device may be provided on a single board.

In the instrumentation system described above, the connection device may be provided on a board different from a board on which the control device is provided.

In the instrumentation system described above, at least one of the plurality of slots may be set to be an empty slot and the second I/O module may be attached to the empty slot when the first I/O module is required to be replaced.

In the instrumentation system described above, the host control device may further include other control device for making the control device redundant.

A method for maintaining an instrumentation system according to one embodiment of the present invention may include operating a first I/O module in a pseudo redundant configuration among I/O modules attached to a connection device. The connection device may include a plurality of slots. I/O modules may be respectively attachable to the slots. A plurality of field devices may be connectable to the I/O module. Each of the field devices may be configured to perform at least one of measuring and operation of a target. The first I/O module may be set to have a non-redundant configuration. The method for maintaining the instrumentation system described above may further include making the first I/O module redundant by newly attaching a second I/O module to the slot when the first I/O module is required to be replaced, and transferring a control right of the first I/O module to the second I/O module.

The method for maintaining the instrumentation system described above may further include, before transferring the control right of the first I/O module to the second I/O module, setting the second I/O module to have a similar function to a function of the first I/O module.

The method for maintaining the instrumentation system described above may further include masking normality information. The normality information may be transmitted from the first I/O module to a host device and indicate abnormality. The host device may be configured to individually set the I/O modules attached to the slots to have a redundant configuration or a non-redundant configuration.

The method for maintaining the instrumentation system described above may further include, after transferring the control right of the first I/O module to the second I/O module, detaching the first I/O module from the slot.

According to one aspect of the present invention, among I/O modules, each of which is attached to a slot of a connection device, an I/O module set to have a non-redundant configuration is operated in a pseudo redundant configuration. Thereby, when a new I/O module is attached, it is possible to make the I/O module redundant. Therefore, when a multipoint type I/O module having a non-redundant configuration is used, the one aspect of the present invention allows for prevention of decrease of the availability ratio and the maintainability.

DETAILED DESCRIPTION OF THE INVENTION

Hereinafter, instrumentation systems and methods for maintaining the instrumentation system according to several embodiments of the present invention will be described in detail, with references made to the drawings.

First Embodiment

Figure 1:
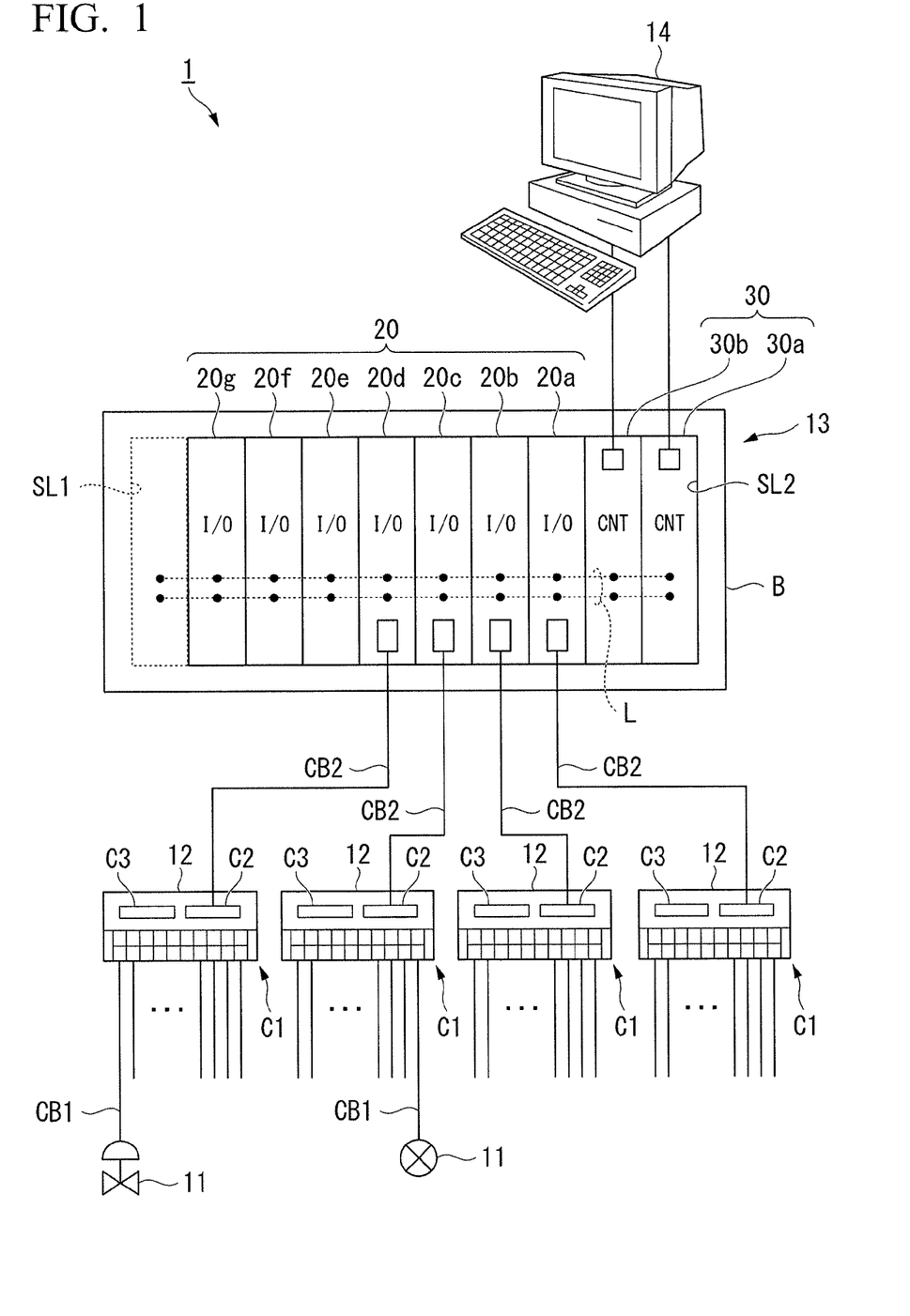
FIG. 1 is a diagram showing the configuration of an instrumentation system according to a first embodiment of the present invention.

FIG. 1 is a diagram showing the configuration of an instrumentation system according to a first embodiment of the present invention. As shown in FIG. 1, an instrumentation system 1 according to the first embodiment includes field devices 11, terminal boards 12, a connection control device 13 (connection device), and a monitoring device 14 (host control device, host device). In the instrumentation system 1, the connection control device 13 controls the field devices 11 under the monitoring of the monitoring device 14, thereby, a process implemented in a plant or a factory or the like (hereinafter, collectively simply called a "plant") is controlled.

The field device 11 is installed on site of a factory, and performs at least one of measuring and operation of a target required for the control of the process. Specifically, the field device 11 includes, for example, a sensor device such as a flow gauge or temperature sensor, a valve device such as a flow rate control valve or open and close value, an actuator device such as a fan or motor, an imaging device such as a camera or video for taking an image of a target or the situation in a plant, an acoustic device such as a microphone or speaker for collecting abnormal noise or the like in a plant or emitting a warning sound or the like, a position detection device for outputting position information of each device, and other devices. These field devices 11 are connected to the terminal board 12 via a field cable CB1. The field cable CB1 includes two or more cables and is for transmitting singular communication link.

The terminal board 12 is a line concentrator for concentrating the field cables CB1, each of which is connected to the field device 11, and connecting the field cables CB1 to the connection control device 13. The terminal board 12 includes a plurality of connectors C1, and two connectors C2 and C3. The field cable CB1 is connectable to the connector C1. A cable for a terminal board CB2 is connectable to each of the two connectors C2 and C3. The cable for the terminal board CB2 is connected to an I/O module 20 (the details of the I/O module 20 will be described later) of the connection control device 13. The cable for the terminal board CB2 can transmit a plurality of communication links.

The plurality of connectors C1, each of which the field cables CB1 are connected to, are electrically connected to each of the cables which constitute the terminal board CB2 when the cable for the terminal board CB2 is connected to the connector C2, and are electrically connected to each of the cables which constitute the terminal board CB2 when the cable for the terminal board CB2 is connected to the connector C3. In other words, it can be said that the terminal board 12 is a line concentrator for concentrating the plurality of field cables CB1 connected to the connector C1 (field cables CB1 for one channel connected to each field device 11), and connecting the concentrated field cables CB1 to the cable for the terminal board CB2 connected to one of the connectors C2 and C3 (the cable for the terminal board CB2 for a plurality of channels connected to the I/O module 20).

The I/O module 20 provided on the connection control device 13 is used in a redundant configuration (redundant configuration), or in a non-redundant configuration (non-redundant configuration: single configuration). The details of the I/O module 20 will be described later. When each of the I/O modules 20 in the redundant configuration is connected to the terminal board 12, one I/O module 20 in the redundant configuration is connected to the connector C2 via one cable for the terminal board CB2, and the other I/O module 20 in the redundant configuration is connected to the connector C3 via the other cable for the terminal board CB2.

On the other hand, when the I/O module 20 in the single configuration is connected to the terminal board 12, as shown in FIG. 1, the I/O module 20 in the single configuration is connected to only one of the connectors C2 and C3 (the connector C2 in the example shown in FIG. 1). In this configuration, as shown in FIG. 1, the other of the connectors C2 and C3 (the connector C3 in the example shown in FIG. 1) is not used.

The connection control device 13 includes a backboard B, I/O modules 20, and a controller 30 (host control device, control device). The connection control device 13 is for performing both a processing of signals received from and transmitted to the field device 11 and a control of the field device 11 under the monitoring of the monitoring device 14. One connection control device 13 is shown in FIG. 1, to which up to eight I/O modules 20 and up to two controllers 30 are attachable. The maximum number of I/O modules 20, which are attachable to the backboard B, may be greater or less than eight, and the number of controllers 30, which are attachable to the backboard B, may be only one, or equal to or greater than three.

The backboard B is a board, which includes a plurality of slots SL1 (eight slots SL1 in the example shown in FIG. 1) and a plurality of slots SL2 (two slots SL2 in the example shown in FIG. 1). The I/O modules 20 are attachable to the slots SL1, respectively. The controllers 30 are attachable to the slots SL2, respectively. FIG. 1 shows that the I/O modules 20 (20a to 20g) are respectively attached to seven slots SL1 among eight slots SL1 provided in the backboard B, the controllers 30 (30a and 30b) are respectively attached to all two slots SL2.

Among the plurality of slots SL1 provided in the backboard B, at least one of the slots SL1 has empty state (empty slot). This enables the replacement of abnormal I/O module 20 in the single configuration without decreasing the availability ratio and the maintainability of the instrumentation system 1 when abnormality, such as a failure, occurs in the I/O module 20 in the single configuration and the replacement of I/O module 20 is required.

Communication lines L are provided on the backboard B. The communication line L is for electrically connecting the I/O modules 20 attached to the slots SL1 and the controllers 30 attached to the slots SL2 and enables the communication between them. The communication lines L are made redundant in order to enhance the reliability. In other words, the I/O module 20 attached to the slot SL1 and the controller 30 attached to the slot SL2 are electrically connected to each other via two communication lines.

The I/O module 20 is one, to which a plurality of field devices 11 is connectable via the terminal board 12. The I/O module 20 is connected to the controller 30 via the communication line L provided on the backboard B. The I/O module 20 performs a processing (signal conversion and protocol conversion) of signals, which are input and output between the field device 11 connected to the I/O module 20 and the controller 30. It can be said that the I/O module 20 is for connecting a plurality of field devices 11 to the controller 30 and is for relaying signals output from the field device 11 and input to the controller 30 and signals output from the controller 30 and input to the field device 11.

The I/O module 20 is set to have a redundant configuration or the single configuration by the monitoring device 14. In the redundant configuration, two I/O modules 20 (for example, I/O modules 20f and 20g) are paired. One of the paired I/O modules 20 (for example, I/O module 200 is in activated state, and the other (for example, I/O module 20g) is in standby state. On the other hand, in the single configuration, the I/O modules are not paired as in the redundant configuration, and individually operate under the control of the controller 30.

In the first embodiment, in order to simplify the explanation, each of all I/O modules 20 (I/O modules 20a to 20g) attached to the connection control device 13 is set to have the single configuration by the monitoring device 14. Even if each I/O module 20a to 20g is set to have the single configuration by the monitoring device 14, each I/O module 20a to 20g operates in a pseudo redundant configuration by the controller 30. The details will be described later.

Figure 2:
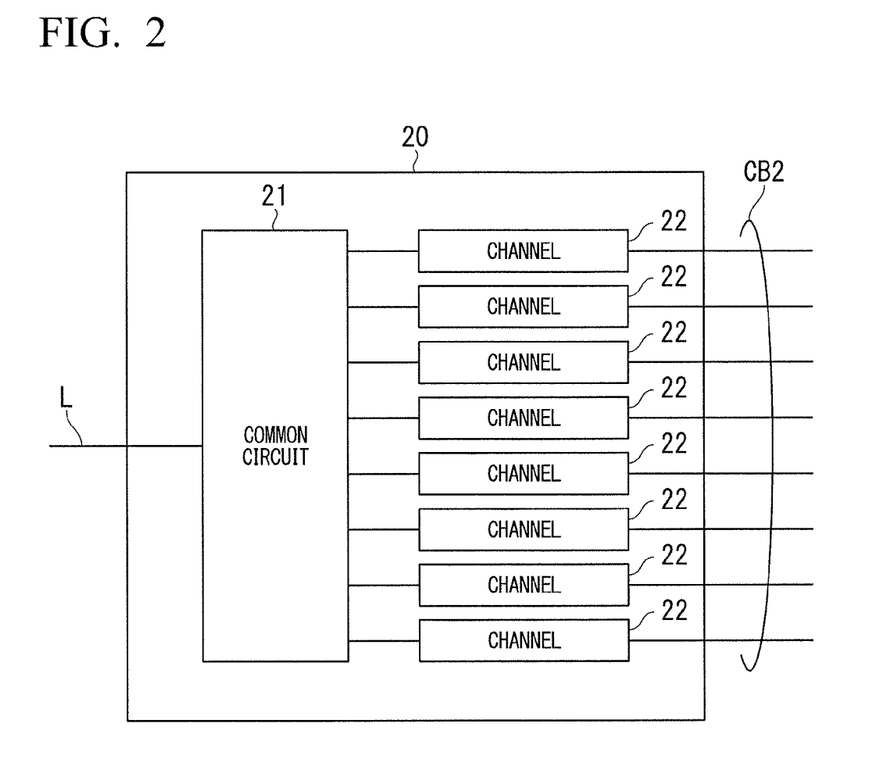
FIG. 2 is a block diagram showing the internal configuration of an I/O module according to the first embodiment of the present invention.

FIG. 2 is a block diagram showing the internal configuration of the I/O module according to the first embodiment of the present invention. As shown in FIG. 2, the I/O module 20 includes a common circuit 21 and a plurality of channels 22. The I/O module 20 shown in FIG. 2 is an eight-channel I/O module including eight channels 22. A number of the channels 22 provided on the I/O module 20 (number of channels) is optional. For example, the I/O module 20 may be a four-channel I/O module including four channels 22, or a sixteen-channel I/O module including sixteen channels 22.

The common circuit 21 is connected to the communication line L provided on the backboard B. The common circuit 21 inputs signals, which are output from the communication line L, into any of the channels 22, and inputs signals, which are output from the channel 22, into the communication line L. In other words, the common circuit 21 relays signals transmitted and received via the communication line L, and signals transmitted to and received from each of the plurality of channels 22. In addition, the common circuit 21 operates the I/O module 20 in the redundant configuration or in the single configuration (pseudo redundant configuration) in accordance with the setting of the monitoring device 14. As described above, the communication lines L provided on the backboard B have the redundant configuration. The redundant configuration is omitted from FIG. 2.

The channels 22 are respectively connected to cables, which constitute the cable for the terminal board CB2. Each channel 22 is connected to the field device 11 in a one-on-one relationship. A processing circuit based on the type (type of signal input to and output from the field device 11) of field device 11, which is connected to the channel 22, is provided on the channel 22. For example, a conversion circuit for converting analog signals to digital signals as the above-described processing circuit is provide on the channel 22, to which a field device 11 for outputting analog signals such as "4 to 20 mA" signal is connected. An insulated circuit or a voltage conversion circuit as the above-described processing circuit is provide on the channel 22, to which a field device 11 including an electromagnetic valve is connected.

Instead of the above-described processing circuit, a universal-circuit may be provided on the channel 22. The universal-circuit is described in, for example, U.S. Pat. No. 8,392,626 or the like and is capable of performing an input of analog signals from the field device 11, an output of analog signals to the field device 11, an input of digital signals from the field device 11, and an output of digital signals to the field device 11. Among the input and output operations described above, the type of operation, which the universal-circuit performs, is set based on, for example, the control of the controller 30. In the first embodiment, a universal-circuit is provided on the channel 22 of the I/O module 20.

The controller 30 controls the field device 11 under the monitoring of the monitoring device 14. Specifically, the controller 30 collects measured data from one field device 11 (for example, sensor device), calculates control data for controlling other field device 11 (for example, valve device), and sends the control data to the other field device 11 (for example, valve device). The two controllers 30 (30a and 30b) provided on the connection control device 13 are made redundant in order to enhance the reliability. For example, the controller 30a is in activated state, and the controller 30b is in standby state.

In addition, the controller 30 operates the I/O module 20, which is set to have the single configuration by the monitoring device 14, among the I/O modules 20 attached to the slots SL1 of the connection control device 13, in a pseudo redundant configuration. The pseudo redundant configuration indicates that one I/O module 20 is operated in activated state under a condition where the other I/O module, which is paired with the one I/O module 20 in the redundant configuration, is not decided.

In other words, in an original redundant configuration, one I/O module 20, which is paired with the other I/O module 20, is previously defined. Unless abnormality such as a failure occurs, the one I/O module 20 in activated state and the other I/O module 20 in standby state operate in pairs. On the other hand, the I/O module 20 in the pseudo redundant configuration operates on the condition that there is no I/O module, which is paired with the I/O module 20. When abnormality such as a failure occurs in the I/O module, which operates in the pseudo redundant configuration and the replacement of I/O module is required, the I/O module is made redundant using a new I/O module attached to the slot SL1 of the connection control device 13.

When abnormality such as a failure occurs in the I/O module 20 and the replacement of I/O module 20 is required, the I/O module 20 in the single configuration is required to have the pseudo redundant configuration. Therefore, at least, when the replacement of I/O module 20 in the single configuration is required, the controller 30 operates the I/O module 20 in the pseudo redundant configuration. In the first embodiment, in order to simplify the explanation, immediately after the monitoring device 14 sets all of the I/O modules 20 (I/O modules 20a to 20g) to have the single configuration, the controller 30 operates all of the I/O modules 20 in the pseudo redundant configuration.

Figure 3:
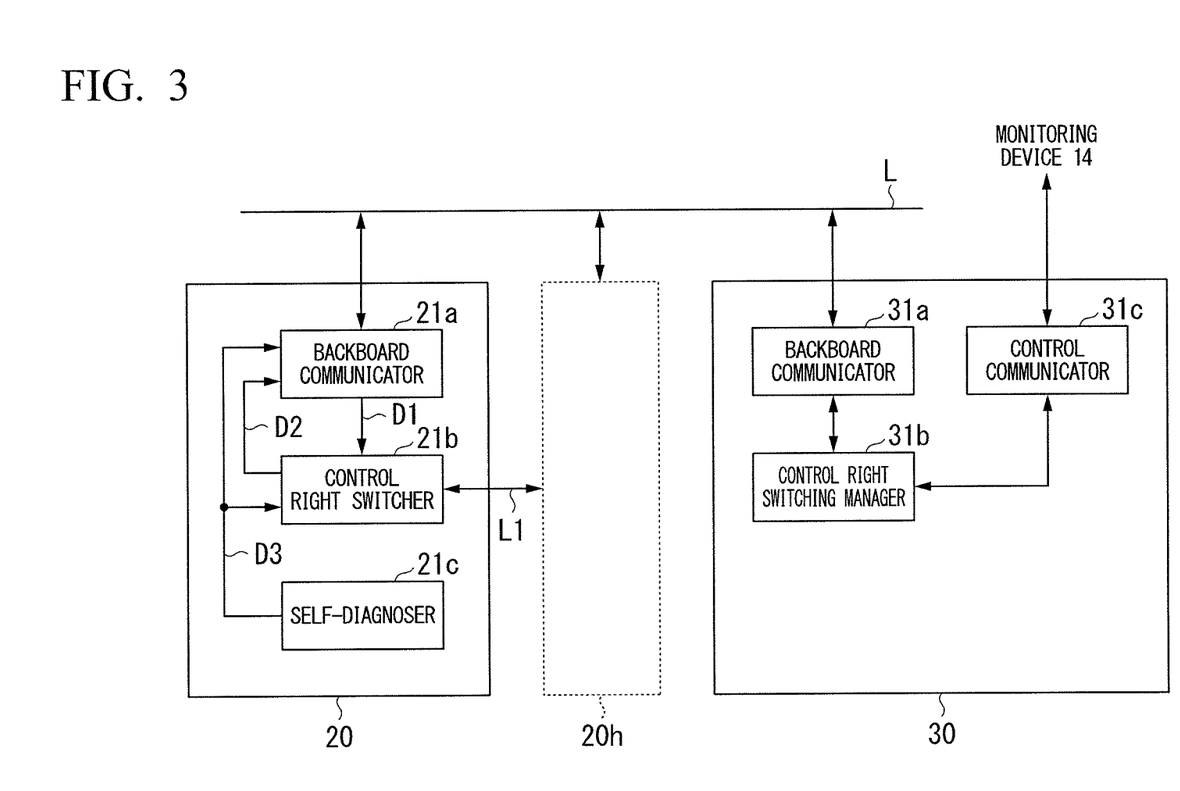
FIG. 3 is a block diagram showing the main parts of the configuration of the I/O module and the main parts of the configuration of a controller according to the first embodiment of the present invention.

FIG. 3 is a block diagram showing the main parts of the constitution of each of the I/O module and the controller according to the first embodiment of the present invention. As shown in FIG. 3, the I/O module 20 includes a backboard communicator 21a, a control right switcher 21b, and a self-diagnoser 21c. The backboard communicator 21a, the control right switcher 21b, and the self-diagnoser 21c may be provided inside the common circuit 21 shown in FIG. 2, or may be provided outside the common circuit 21. Similar to FIG. 2, the communication line L provided on the backboard B is simplified in FIG. 3.

The backboard communicator 21a performs transmission and receiving of various signals via the communication line L provided on the backboard B. Specifically, the backboard communicator 21a receives setting data D1 transmitted from the controller 30 via the communication line L and outputs the setting data D1 to the control right switcher 21b. In addition, the backboard communicator 21a transmits redundant state data D2 output from the control right switcher 21b and self-diagnosis data D3 output from the self-diagnoser 21c to other I/O module 20 or the controller 30 via the communication line L.

The above-described setting data D1 is for setting the configuration of the I/O module 20 (one of the redundant configuration, the pseudo redundant configuration, and the single configuration), the kind of signal transmitted to and received from the field device 11, and various parameters and the like. The above-described redundant state data D2 indicates state where the I/O module 20 operates in the redundant configuration or state where the I/O module 20 operates in the pseudo redundant configuration. The redundant state data D2 includes control right information, which indicates whether a module itself has the control right, and normality information, which indicates whether abnormality occurs in an I/O module in standby state. The above-described self-diagnosis data D3 indicates results of self-diagnosis which the self-diagnoser 21c performs. The control right switcher 21b receives the self-diagnosis data D3 as an input, and generates information which indicates whether abnormality occurs in the I/O module including the control right switcher 21b. The generated information is to be notified to the other I/O module, which is paired with the I/O module. The generated information is included in the redundant state data D2.

When the I/O module 20 operates in the pseudo redundant configuration, there is no I/O module in standby state. Therefore, the normality information included in the above-described redundant state data D2 indicates abnormality. Basically, the above-described setting data D1, redundant state data D2, and self-diagnosis data D3 are transmitted and received via the communication line L provided on the backboard B. The control right information and the normality information included in the redundant state data D2 may be transmitted and received via a dedicated line L1 provided on the backboard B separately from the communication line L.

When the I/O module 20 is set to operate in the redundant configuration or the pseudo redundant configuration by the setting data D1, the control right switcher 21b switches the control right which defines whether the I/O module 20 is in activated state or standby state under the management of the controller 30. For example, the control right switcher 21b acquires the control right when the I/O module 20 normally operates in the pseudo redundant configuration, and transfers the control right to a new I/O module (I/O module 20h shown in FIG. 3) attached to the slot SL1 (empty slot) when abnormality such as a failure occurs in the I/O module 20. In addition, the control right switcher 21b outputs the above-described redundant state data D2 based on the redundant state.

Specifically, the control right switcher 21b determines whether the module itself is normal to the extent that the module itself can continue the control based on the self-diagnosis data D3 transmitted from the self-diagnoser 21c, and generates the above-described normality information. Next, the control right switcher 21b determines whether the transfer of control right is possible based on own normality information of the module, normality information of other I/O module (for example, the I/O module 20h shown in FIG. 3), and setting data. When the control right switcher 21b determines that the transfer of control right is possible, the control right switcher 21b transfers the control right to other I/O module (for example, the I/O module 20h shown in FIG. 3).

The self-diagnoser 21c diagnoses whether the own state of the module is normal, and outputs the self-diagnosis data D3, which indicates the diagnosis results, to the backboard communicator 21a and the control right switcher 21b. As described above, there are some cases where the self-diagnosis data D3 output from the self-diagnoser 21c is used not only in the module itself, but also in other I/O module.

The controller 30 includes a backboard communicator 31a, a control right switching manager 31b, and a control communicator 31c. Similar to the backboard communicator 21a of the I/O module 20, the backboard communicator 31a performs transmission and receiving of various signals via the communication line L provided on the backboard B. Specifically, the backboard communicator 31a transmits the setting data D1 output from the control right switching manager 31b to the I/O module 20 via the communication line L, receives the redundant state data D2 and the self-diagnosis data D3 transmitted via the communication line L, and outputs the redundant state data D2 and the self-diagnosis data D3 to the control right switching manager 31b.

As necessary, the control right switching manager 31b converts the setting data, which is transmitted from the monitoring controller 14. Specifically, when the setting data transmitted from the monitoring device 14 indicates that the I/O module 20 is set to have the single configuration, the control right switching manager 31b converts the setting data so that the setting data indicates that the I/O module 20 is set to have a pseudo redundant configuration. In addition, the control right switching manager 31b controls the transfer of the control right between the I/O modules 20 with reference to the redundant state data D2 transmitted from the I/O module 20, receives the self-diagnosis data D3 transmitted from the I/O module 20, and recognizes the state of the I/O module 20. The control communicator 31c communicates with the monitoring device 14.

When the I/O module 20 operates in the pseudo redundant configuration, there is no I/O module in standby state. Therefore, the normality information included in the redundant state data D2 indicates abnormality. When the normality information is transmitted to the monitoring device 14, this means that the normality information, which indicates the abnormality of the I/O module in standby state, is transmitted from the I/O module in the single configuration. Thereby, there are some cases where a maintenance worker using the monitoring device 14 is confused. In order to avoid such situation, the control right switching manager 31b masks the normality information transmitted from the I/O module 20, which operates in the pseudo redundant configuration, and prevent to transmit the normality information to the monitoring device 14.

The monitoring device 14 is operated by, for example, an operator of a plant, and is for using for a monitoring of process and various settings (settings of the field device 11 and the I/O module 20). Specifically, the monitoring device 14 acquires the input and output data of the field device 11 from the controller 30, and displays the input and output data. The monitoring device 14 operates the field device 11 based on instructions input by necessary operations of an operator.

In addition, the monitoring device 14 can individually set the I/O modules 20 attached to the connection control device 13 to have the redundant configuration or a non-redundant configuration based on instructions of an operator of a plant. As described above, in the first embodiment, each of all of the I/O modules 20 attached to the connection control device 13 is set to have the single configuration. In addition, the monitoring device 14 can set the universal circuit provided on the channel 22 of the I/O module 20 (refer to FIG. 2) based on instructions of an operator of a plant. In other words, the monitoring device 14 can set a new I/O module (I/O module 20h shown in FIG. 3) attached to the connection control device 13 to have similar functions to those of the I/O module 20 (the I/O module 20 operating in the pseudo redundant configuration), which is required to be replaced.

Figure 4:
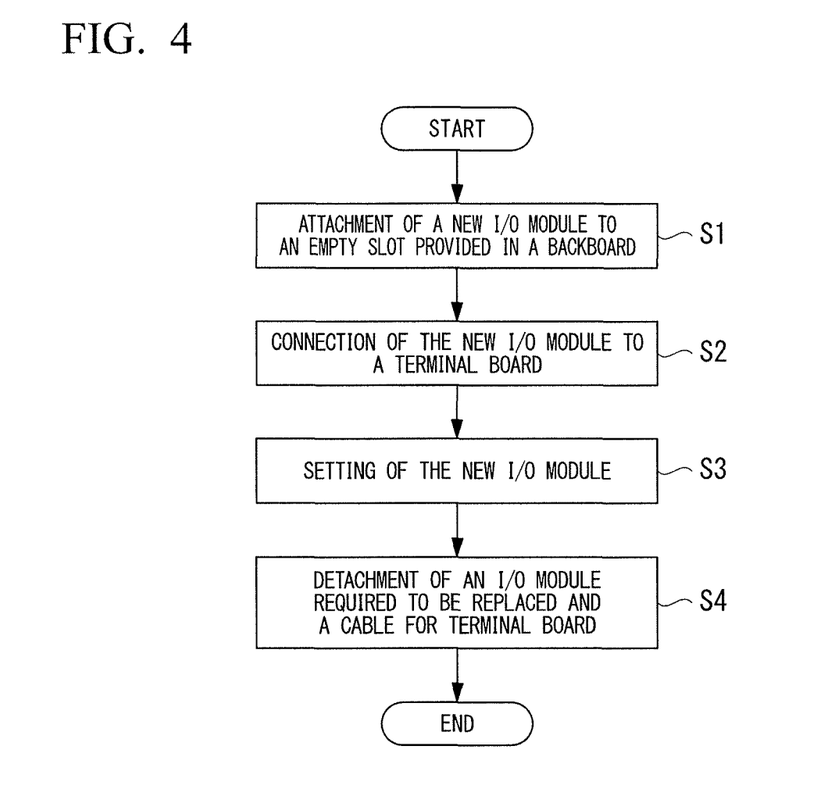
FIG. 4 is a flowchart showing a replacement procedure of the I/O module according to the first embodiment of the present invention.
Figure 5A:
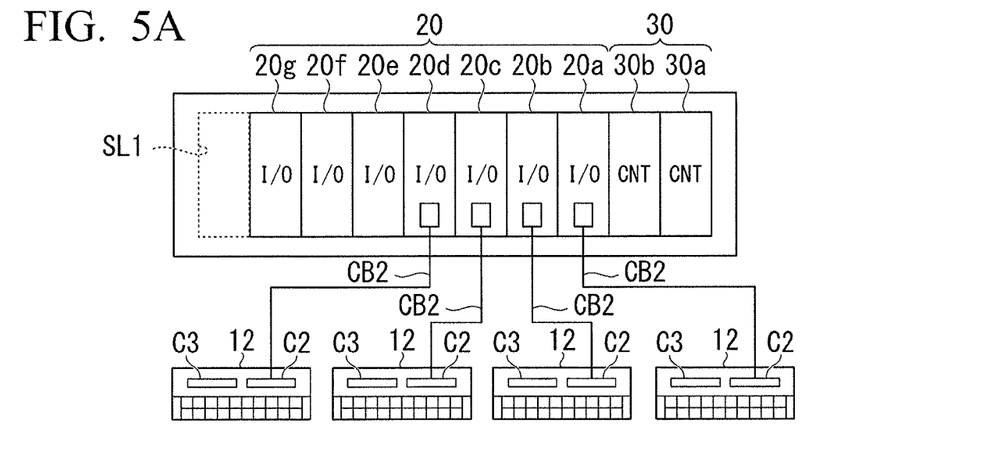
FIG. 5A is a diagram showing an operation state during the replacement operation of the I/O module according to the first embodiment of the present invention.
Figure 5B:
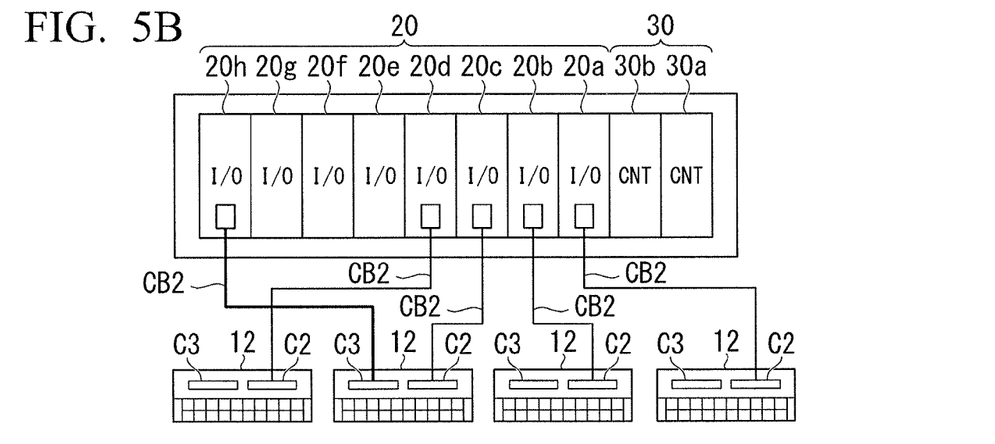
FIG. 5B is a diagram showing the operation state during the replacement operation of the I/O module according to the first embodiment of the present invention.
Figure 5C:
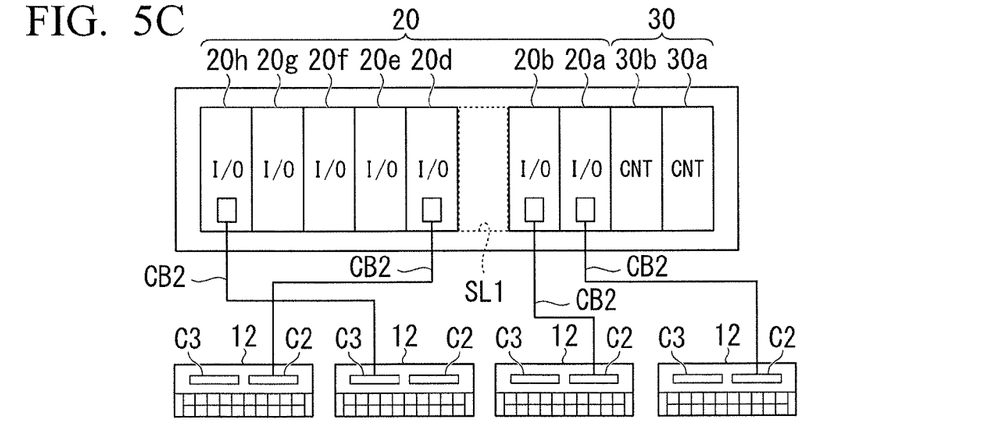
FIG. 5C is a diagram showing the operation state during the replacement operation of the I/O module according to the first embodiment of the present invention.

Next, in the instrumentation system 1 having the above-described configuration, the replacement procedure of the I/O module 20, which is set to have the single configuration by the monitoring device 14, will be described. FIG. 4 is a flowchart showing a replacement procedure of the I/O module according to the first embodiment of the present invention. Each of FIGS. 5A to 5C is a diagram showing an operation state during the replacement operation of the I/O module according to the first embodiment of the present invention.

Hereinafter, a description will be provided for the case in which a failure occurs in the I/O module 20c among the I/O module 20 (20a to 20g), which is attached to the backboard B of the connection control device 13. As shown in FIG. 5A, in an initial state before a failure occurs in the I/O module 20c, the I/O modules 20a to 20d are connected to first to fourth connectors of the four terminal boards 12 via first to fourth cables for the terminal board CB2, respectively.

When an operation for replacing the I/O module 20c is initiated, an operation for attaching a new I/O module 20 (an I/O module 20h shown in FIG. 3) to a slot SL1 (empty slot) provided in the backboard B of the connection control device 13 is performed (step S1). In the example shown in FIG. 5A, the new I/O module 20h is attached to a leftmost slot SL1 (a slot located on the left side of one, to which the I/O module 20g is attached) among the slots SL1 provided in the backboard B.

Next, an operation for connecting the new I/O module 20h to the terminal board 12 is performed (step S2). Specifically, as shown in FIG. 5B, an operation for connecting the new I/O module 20h to the connector C3 of the terminal board 12, which is connected to the I/O module 20c required to be replaced, via the cable for the terminal board CB2 is performed.

Subsequently, a setting operation for the I/O module 20h using the monitoring device 14 is performed (stem S3). Specifically, an operation for setting the universal-circuit provided on the channel 22 (refer to FIG. 2) of the I/O module 20h based on the kind of the field device 11, which is connected to the channel 22, is performed. In other words, a setting for making the new I/O module 20h have the similar functions to those of the I/O module 20c, which is required to be replaced, is performed.

After the above-described setting operations have been finished, an operation for detaching the I/O module 20c required to be replaced and the cable for the terminal board CB2 connected to the I/O module 20c is performed (step S4). Thereby, as shown in FIG. 5C, the slot SL1, to which the I/O module 20c has been attached, becomes an empty slot, and only the new I/O module 20h comes to be connected to the terminal board 12, to which the I/O module 20c has been connected. Thereby, the replacement operation of the I/O module 20c is finished.

Figure 6:
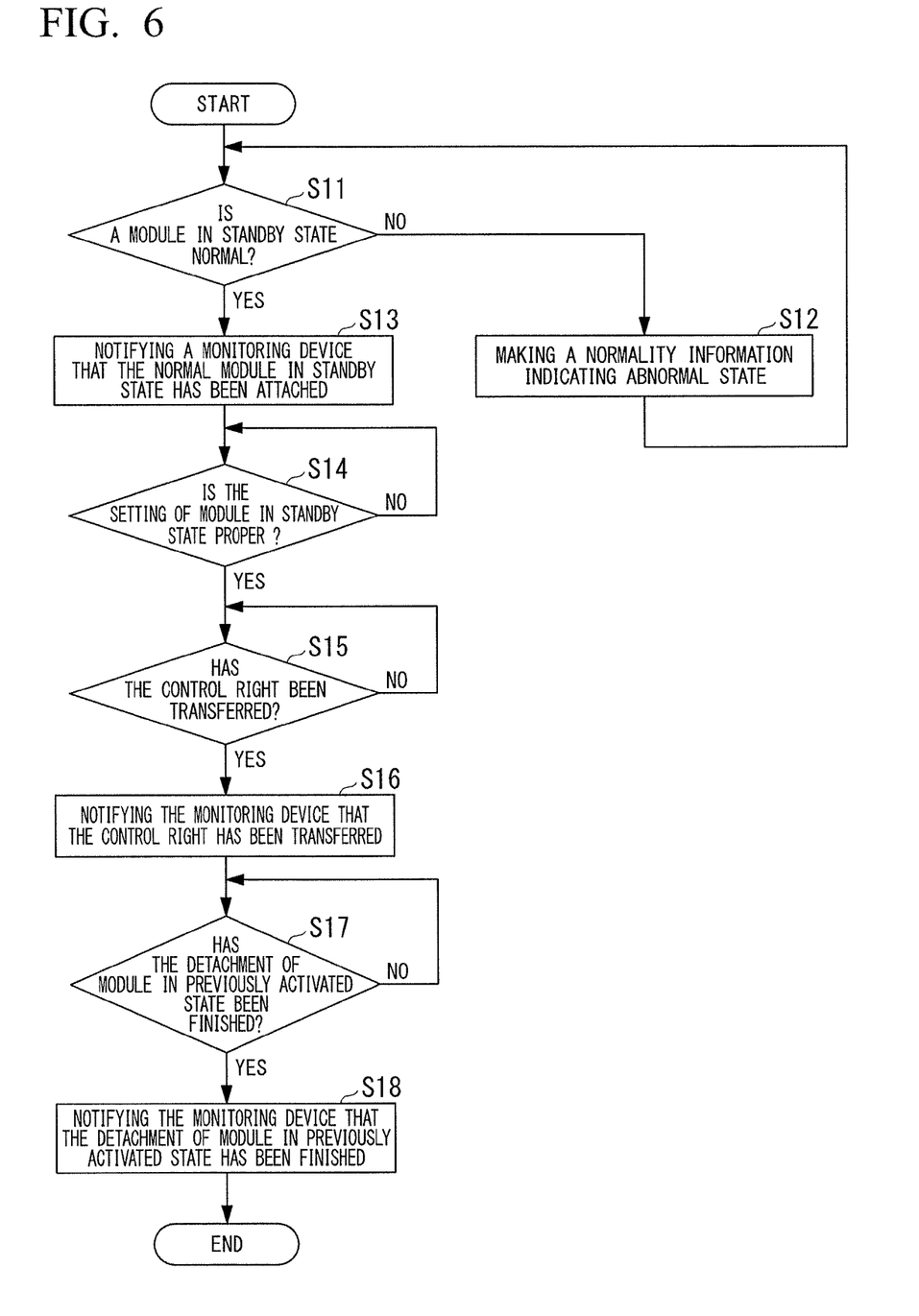
FIG. 6 is a flowchart showing an operation of control right switching manager during the replacement operation of the I/O module according to the first embodiment of the present invention.

Next, the operation of the control right switching manager 31b of the controller 30 during the above-described replacement operation will be described. FIG. 6 is a flowchart showing an operation of a control right switching manager during the replacement operation of the I/O module according to the first embodiment of the present invention. The flowchart shown in FIG. 6 is initiated when the self-diagnosis data D3 indicating occurrence of failure is transmitted from the I/O module 20c and received by the controller 30.

When the control right switching manager 31b of the controller 30 receives setting data for making the I/O module 20c to have the single configuration from the monitoring device 14, the control right switching manager 31b transforms the setting data into setting data D1 for making the I/O module 20c to have a pseudo redundant configuration, and transmits the setting data D1 to the I/O module 20c. Thereby, the control right switching manager 31b operates the I/O module 20c, which has been set to have the single configuration by the monitoring device 14, in the pseudo redundant configuration.

When the process of the flowchart shown in FIG. 6 is initiated, first, the control right switching manager 31b refers redundant state data D2 transmitted from the failed I/O module 20c, and determines whether the I/O module 20 in standby state (I/O module 20h shown in FIG. 3) in the redundant configuration is normal (step S11). Since, at the time of the occurrence of failure, the I/O module 20 in standby state (I/O module 20h shown in FIG. 3) in the redundant configuration is not connected to the connection control device 13 and the normality information included in the redundant state data D2 indicates abnormality, the determination result in the step S11 becomes "NO".

When the determination result in the step S11 is "NO", the control right switching manager 31b masks the normality information (the normality information indicates abnormality) transmitted from the I/O module 20c (step S12). Since the normality information transmitted from the I/O module 20c is deleted by the control right switching manager 31b of the controller 30 in this process, the normality information is not transmitted to the monitoring device 14. Until the I/O module 20 (I/O module 20h shown in FIG. 3) in standby state in the redundant configuration is attached to the connection control device 13, the step S11 and step S12 are repeated.

When the new I/O module 20 (the I/O module 20h shown in FIG. 3) is attached to the connection control device 13 by the operation of step S1 shown in FIG. 4, the transmitting and receiving of various information between the failed I/O module 20c and the new I/O module 20h are performed, thereby, the failed I/O module 20c is made redundant by using the new I/O module 20h. Thereby, the normality information included in the redundant state data D2 transmitted from the I/O module 20c indicates normality.

When the controller 30 receives the redundant data D2, the control right switching manager 31b determines that the I/O module 20c in standby state is normal, thereby, the determination result in the step S11 becomes "YES". Then, the control right switching manager 31b performs an operation for notifying the monitoring device 14 that the I/O module in standby state (new I/O module 20h), which is normal, is attached (step S13).

After the above-described process is finished, the control right switching manager 31b refers the redundant state data D2 or the self-diagnosis data D3 transmitted from the new I/O module 20h and determines whether the setting of the I/O module in standby state (new I/O module 20h) has been properly performed (step S14). When the operations of the steps S2 and S3 shown in FIG. 4 has not been performed or the operations of the steps S2 and S3 has been performed but the setting of the new I/O module 20h is improper, the determination result in the step S14 is "NO".

On the other hand, when the setting of the new I/O module 20h has been properly performed, the determination result in the step S14 is "YES". Then, the control right switching manager 31b refers the redundant state data D2 transmitted from the I/O modules 20c and 20h and determines whether the control right of the failed I/O module 20c has been transferred to the new I/O module 20h in standby state (step S15).

When the control right switching manager 31b determines that the control right of the failed I/O module 20c has not been transferred to the new I/O module 20h in standby state (the determination result is "NO"), the process in the step S15 is repeated. On the other hand, when the control right of the failed I/O module 20c has been transferred to the new I/O module 20h in standby state, the determination result of the step S15 is "YES", then, the control right switching manager 31b notifies the monitoring device 14 that the control right of the I/O module 20c has been transferred to the I/O module 20h (step S16).

After the above-described process is finished, the control right switching manager 31b determines whether the detachment of the failed I/O module 20c has been finished (step S17). When the operation of step S4 shown in FIG. 4 is not performed, the determination result of step S17 is "NO". On the other hand, when the operation of step S4 shown in FIG. 4 has been performed and the I/O module 20c has been detached from the connection control device 13, the determination result of step S17 is "YES". Then, the control right switching manager 31b notifies the monitoring device 14 that the failed I/O module 20c has been detached from the connection control device 13 (step S18). Thus, a series of processes shown in FIG. 6 is finished.

As described above, in the first embodiment, in the I/O module 20 attached to the connection control device 13, the I/O module 20 (20a to 20g), which has been set to have the single configuration by the monitoring device 14, is operated in a pseudo redundant configuration. When the I/O module 20, which operates in a pseudo redundant configuration, is failed, the control right of the failed I/O module 20 (20c) is transferred to the new I/O module 20h after making the failed I/O module 20 (20c) redundant by attaching the new I/O module 20h to the connection control device 13.

Therefore, since the new I/O module 20h succeeds a normal control loop, which has been performed via the failed I/O module 20 (20c) when the I/O module 20 (20c), which is set to have a single configuration by the monitoring device 14, is failed, it is unnecessary to stop the normal control loop. Therefore, even if the I/O module 20, to which a plurality of field devices 11 is connectable, is set to operate in the single configuration by the monitoring device 14, it is possible to prevent the decrease of the availability ratio and the maintainability of the instrumentation system 1.

Second Embodiment

Figure 7:
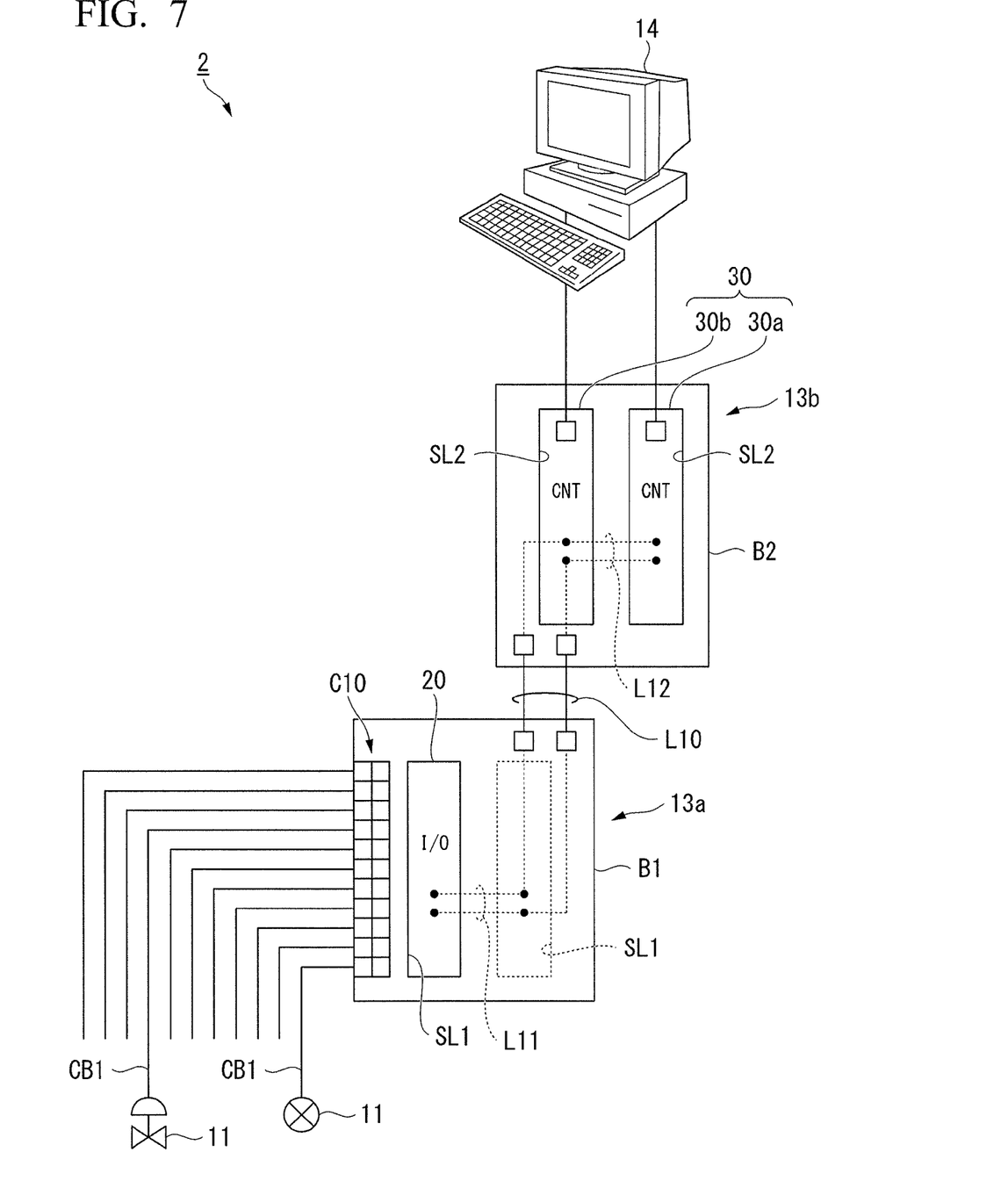
FIG. 7 is a diagram showing the configuration of an instrumentation system according to a second embodiment of the present invention.

FIG. 7 is a diagram showing the configuration of an instrumentation system according to a second embodiment of the present invention. In FIG. 7, blocks that correspond to those in FIG. 1 are assigned the same reference numerals. Generally, as shown in FIG. 7, in an instrumentation system 2 according to the second embodiment, the terminal board 12 shown in FIG. 1 is omitted, the connection control device 13 is divided into a connection device 13a and a control device 13b, and the connection device 13a and the control device 13b are connected to each other via a communication line L10.

The connection device 13a includes a backboard B1 and an I/O module 20, connects the field device 11 with the control device 13b, and performs a processing of signals transmitted and received between the field device 11 and the control device 13b (signal conversion, protocol conversion, or the like). The connection device 13a shown in FIG. 7 can attach up to two I/O modules 20 to the backboard B1. A number of I/O modules, which are attachable to the backboard B1, may be more than two.

The backboard B1 is a board which includes two slots SL1 and a plurality of connectors C10. The I/O module 20 is attachable to the slot SL1. The field device 11 is connected to the connector C10. In the second embodiment, as shown in FIG. 7, the I/O module 20 is attached to only one of the two slots SL1 provided in the backboard B1, and the other of the two slots SL1 is set to be an empty slot. Similar to the first embodiment, this enables the replacement of the abnormal I/O module 20 having a single configuration without decreasing the availability ratio and the maintainability of the instrumentation system 2 when abnormality such as a failure, occurs in the I/O module 20 having the single configuration and the replacement of I/O module 20 is required.

Similar to the connector C1 of the terminal board 12 shown in FIG. 1, each of the connectors C10 provided on the backboard B1 is one, to which the field cable CB1 is connectable. The connector C10 is electrically connected to both the two slots SL1. Thereby, when one I/O module 20 and the other are respectively attached to the two slots SL1, the field device 11 connected to the connector C10 is connected to both one I/O module 20 and the other, which are respectively inserted into the two slots SL1. A communication line L11, which corresponds to a part of the communication line L shown in FIG. 1, is provided on the backboard B1, and the two I/O modules 20, each of which is attached to the slot SL1, are electrically connected to each other via the communication line L11.

The control device 13b includes a backboard B2 and a controller 30, is connected to the connector 13a and the monitoring device 14, and controls the field device 11 under the monitoring of the monitoring device 14. The control device 13b shown in FIG. 7 can attach up to two controllers 30 to the backboard B2. A number of the controllers 30, which are attachable to the backboard B2, may be only one or more than three.

The backboard B2 is a board including two slots SL2, to which the controller 30 is attachable. FIG. 7 shows a situation where two slots SL2 are provided in the backboard B2, and the controllers 30 (30a, 30b) are respectively connected to the two slots SL2. A communication line L12, which corresponds to a part of the communication line L shown in FIG. 1, is provided on the backboard B2, and the two controllers 30, each of which is attached to the slot SL2, are electrically connected to each other via the communication line L12.

In the instrumentation system 2 having the above-described configuration, when the I/O module 20 having the single configuration is used, as shown in FIG. 7, the I/O module 20 is attached to only one of the two slots SL1 provided in the backboard B1, and the other of the two slots SL1 is set to be an empty slot. The controller 30 operates the I/O module 20 attached to the slot SL1 of the backboard B1 in the pseudo redundant configuration.

When the I/O module 20 attached to the slot SL1 of the backboard B1 is failed, a new I/O module is attached to the empty slot. Thereby, the failed I/O module is made redundant by using the new I/O module in a similar way to the first embodiment, and the control right of the failed I/O module is transferred to the new I/O module. As described above, since the connector C10 provided on the backboard B1 is electrically connected to the two slots SL1 in the second embodiment, the operation in the step S2 shown in FIG. 4 is omitted.

Each of FIGS. 8A to 8E is a diagram showing a display example of a state of I/O module according to the second embodiment of the present invention. The state of the I/O module 20 attached to the connector 13a is continuously recognized by the controller 30. The controller 30 transmits information indicating the state of the I/O module 20 to the monitoring device 14 and thereby the diagram shown in FIG. 8 is shown.

In FIGS. 8A to 8E, rectangular blocks (icons), to which reference numerals A1 and A2 are assigned, respectively indicate the two slots SL1 provided in the connector 13a. A string ST displayed in each icon A1 and A2 is information indicating a kind of the I/O module 20 (for example, model number) attached to the slot SL1. The string ST illustrated in each of FIGS. 8A to 8E is "Module A". This string is displayed when the I/O module 20 is attached to the slot SL1, and this string is deleted when the I/O module 20 is detached from the slot SL1.

In FIG. 8, a character "R", to which a symbol Q1 is assigned, is displayed when the slot SL1 is used as an empty slot, and a character "C", to which a symbol Q2 is assigned, is displayed when a channel failure occurs. A mark "X", to which a symbol Q3 is assigned, is displayed when the I/O module 20 attached to the slot SL1 is abnormal due to a failure or the like or the setting is not finished.

Figure 8A:
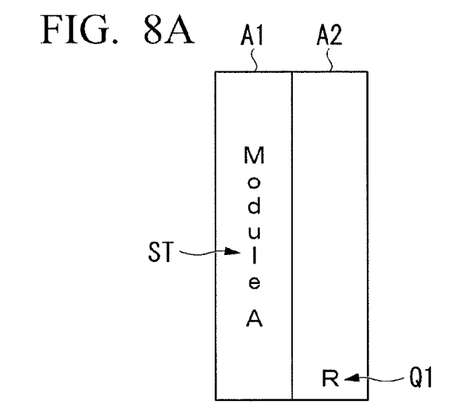
FIG. 8A is a diagram showing a display example of a state of I/O module according to the second embodiment of the present invention.

As shown in FIG. 7, when the I/O module 20, is attached to one of the two slots SL1 provided in the connector 13a, normally operates and the other of the two slots SL1 is set to be an empty slot, the monitoring device 14 displays the diagram shown in FIG. 8A. Specifically, the string ST "Module A" is displayed in the icon A1, and the character "R", to which the symbol Q1 is assigned, is displayed in the icon A2.

Figure 8B:
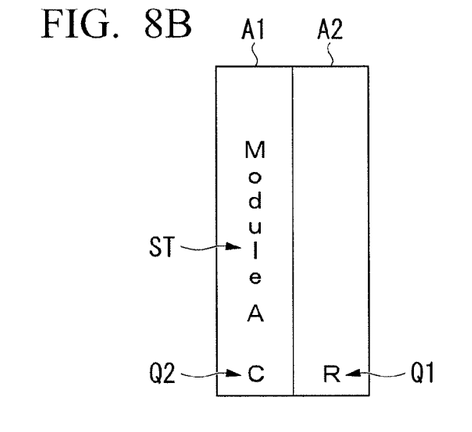
FIG. 8B is a diagram showing a display example of a state of I/O module according to the second embodiment of the present invention.
Figure 8C:
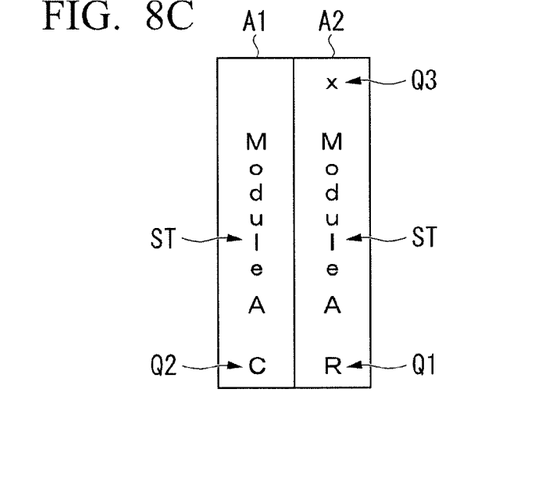
FIG. 8C is a diagram showing a display example of a state of I/O module according to the second embodiment of the present invention.

Next, for example, when a channel failure occurs in the I/O module 20 attached to the slot SL1, as shown in FIG. 8B, the character "C", to which the symbol Q2 is assigned, is displayed in the icon A1. Next, when a new I/O module 20 is attached to the slot SL1, which has been set to be an empty slot, as shown in FIG. 8C, in addition to the string ST "Module A", the mark "X", to which the symbol Q3 is assigned, is displayed in the icon A2.

Figure 8D:
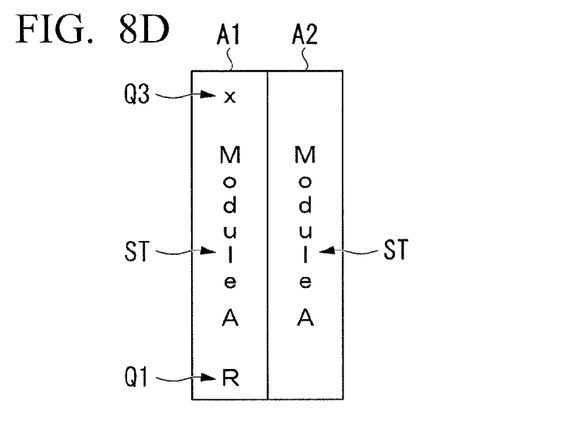
FIG. 8D is a diagram showing a display example of a state of I/O module according to the second embodiment of the present invention.
Figure 8E:
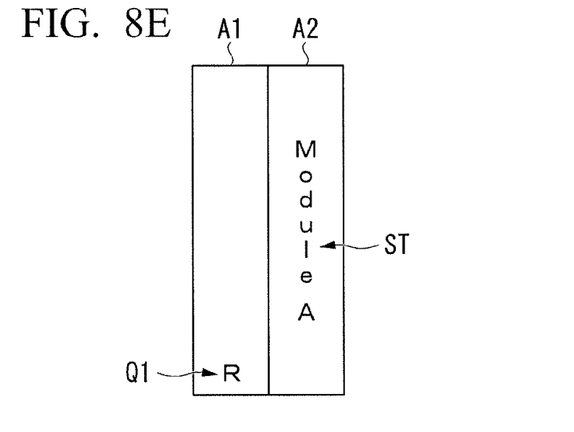
FIG. 8E is a diagram showing a display example of a state of I/O module according to the second embodiment of the present invention.

Subsequently, when the setting of the newly attached I/O module 20 is finished and the control right of I/O module 20, in which the channel failure occurs, is transferred to the new I/O module 20, the monitoring device 14 displays the diagram shown in FIG. 8D. Specifically, the character "C", which had been displayed in the icon A1, is changed into the character "R", and the mark "X", which had been displayed in the icon A2, is deleted and is displayed in the icon A1. When the I/O module 20, in which the channel failure occurs, is detached, as shown in FIG. 8E, the string ST "Module A" and the mark "X", which had been displayed in the icon A1, are deleted.

As described above, similar to the first embodiment, in the second embodiment, the controller 30 operates, in the pseudo redundant configuration, the I/O module 20, which has been set to have the single configuration by the monitoring device 14, and the control right is transferred after making the failed I/O module 20 redundant by attaching the new I/O module 20. Thereby, even if the I/O module 20 is set to be operated in the single configuration by the monitoring device 14, it is possible to prevent the decrease of the availability ratio and the maintainability of the instrumentation system 2.

Although the foregoing has been a description of the instrumentation systems and the methods for the instrumentation system according to some embodiments of the present invention, the present invention is not limited to the embodiments described above, and can be freely modified within the scope of the present invention. For example, in the embodiments described above, the example in which only one empty slot is prepared was described. However, the number of the empty slot is optional. A plurality of empty slots may be prepared for a case where a plurality of I/O modules 20 fails at the same time.

In the embodiments described above, the example in which the control right switching manager 31b for controlling the control right of the I/O module 20 is provided on the controller 30 was described. However, the control right switching manager 31b may be provided on the monitoring device 14. In the embodiments described above, the example in which when the I/O module 20 fails, the failed I/O module 20 is replaced was described. However, even if the I/O module 20 does not fail, the I/O module 20 can be replaced. For example, the I/O module 20 may be replaced for the sake of a preventative replacement due to aging variation, an update to a high-level device, or the like.

In the first embodiment, when the I/O module 20 is replaced, it is necessary to attach the new cable for the terminal board CB2 to the new I/O module 20h. However, by providing a selector between the connection control device 13 and the terminal board 12, the connection between the I/O module 20 and the terminal board 12 may be switched by the switching of the selector.

In the embodiments described above, the example in which a worker performs the setting of the new I/O module 20 (I/O module 20h) using the monitoring device 14 was described. However, when the I/O module 20 to be made redundant is previously defined as the second embodiment, the setting may be automated. Specifically, the controller 30 detects the attachment of the new I/O module 20 (I/O module 20h), and copies the setting data of module in activated state to the new I/O module 20 (I/O module 20h). Thereby, the automation may be implemented.

In the embodiments described above, the example in which the control right of the failed I/O module 20 is automatically transferred to the new I/O module 20 was described. However, the transfer of the control right of the I/O module 20 may be manually performed by a worker. For example, a worker holds a switch or the like down provided on an I/O module, thereby the transfer of control right may be performed.

What is claimed is:

1. An instrumentation system, comprising:
    a plurality of field devices, each of the field devices being configured to perform at least one of measuring and operation of a target;
    a connection device comprising a plurality of slots;
    a plurality of I/O modules being respectively attachable to the slots, the field devices being connectable to the I/O modules, each I/O module comprising a control right switcher that is coupled to the control right switcher of other of the plurality of I/O modules and being operable in a control loop;
    at least one controller coupled to the control right switcher of each I/O module and being connected to control the plurality of I/O modules; and
    a host control device, said host control device being configured:
        to transmit setting data to the controller to individually set the I/O modules attached to the slots to have a redundant configuration or a single configuration based on the setting data, and
        to make two I/O modules set to have the redundant configuration, among the I/O modules attached to the slots, and be paired,
    wherein the controller is configured:
        to operate the two I/O modules set to have the redundant configuration in a redundant configuration under a condition where one of the two I/O modules is in an activated state and the other of the two I/O modules is in a standby state,
        to control the transmission of normality information that indicates the states of the two I/O modules from the controller to the host control device; and to convert setting data for a first I/O module set to have the single configuration, among the I/O modules attached to the slots, to setting data that indicates that the first I/O module is set to a pseudo redundant configuration, and to operate the first I/O module in the pseudo redundant configuration under a condition where the first I/O module is operated in an activated state side of the redundant configuration, in a state where an I/O module to be paired with the first I/O module is not decided, wherein, when the first I/O module is operative in the pseudo redundant configuration, the first module is not paired with another I/O module, wherein, when the first I/O module is operative in the pseudo redundant configuration, the first I/O module is operated in an activated state, no other I/O module is set to be paired with the first I/O module, and at least one of the plurality of slots is empty;

wherein, when the first I/O module is operative in the pseudo redundant configuration, the control right switcher of the first I/O module is operative to hold a control right and when the first I/O module is in a failure mode, the first I/O module is operative to transfer the control right to a new second I/O module inserted into said at least one empty slot when a failure occurs in the first I/O module; and wherein the first I/O module is operative to output a redundant state data to the second I/O module and thereby establish a redundant state between the first I/O module and the second I/O module, whereby, the first I/O unit is replaced by the second I/O unit without stopping operation of the control loop.

2. The instrumentation system according to claim 1, wherein when the first I/O module is required to be replaced, the first I/O module is made redundant by newly attaching the second I/O module to one of the slots.

3. The instrumentation system according to claim 2, wherein when the first I/O module is made redundant, the host control device is configured to transfer the control right of the first I/O module to the second I/O module.

4. The instrumentation system according to claim 3, wherein before the host control device transfers the control right of the first I/O module to the second I/O module, the host control device is configured to set the second I/O module to have a similar function to a function of the first I/O module.

5. The instrumentation system according to claim 1, wherein when the first I/O module is required to be replaced, the host control device is configured to operate the first I/O module required to be replaced in the pseudo redundant configuration.

6. The instrumentation system according to claim 1, wherein the host control device comprises:
a host device configured to individually set the I/O modules attached to the slots to have the redundant configuration or the single configuration; and
a control device configure to control the field devices and to operate the first I/O module set to have the single configuration by the host device, among the I/O modules attached to the slots, in the pseudo redundant configuration.

7. The instrumentation system according to claim 6, wherein the control device is configured to mask normality information, and the normality information is transmitted from the first I/O module to the host device and indicates abnormality.

8. The instrumentation system according to claim 6, wherein the connection device and the control device are provided on a single board.

9. The instrumentation system according to claim 6, wherein the connection device is provided on a board different from a board on which the control device is provided.

10. The instrumentation system according to claim 2, wherein at least one of the plurality of slots is set to be an empty slot, and the second I/O module is attached to the empty slot when the first I/O module is required to be replaced.

11. The instrumentation system according to claim 6, wherein the host control device further comprises other control device for making the control device redundant.

12. A method for maintaining an instrumentation system including I/O modules attached to a connection device, each I/O module comprising a control right switcher that is coupled to the control right switcher of other of the plurality of I/O modules and being operable in a control loop, the connection device comprising a plurality of slots, the I/O modules being respectively attachable to the slots with at least one slot being empty, a plurality of field devices being connectable to the I/O modules, each of the field devices being configured to perform at least one of measuring and operation of a target, the method comprising:

receiving setting data to individually set the I/O modules attached to the slots to have a redundant configuration or a single configuration, based on the setting data;

making two of the I/O modules set to have the redundant configuration, among the I/O modules attached to the slots, be paired;

operating the two I/O modules under a condition where one of the two I/O modules is in an activated state and the other of the two I/O modules is in a standby state;

converting setting data for a first I/O module that is set to have the single configuration, among the I/O modules attached to the slots, to setting data indicating that the first I/O module is set to have a pseudo redundant configuration and operating the first I/O module in the pseudo redundant configuration without being paired with another I/O module, under a condition where the first I/O module is operated in an activated state side of the redundant configuration, in a state where an I/O module to be paired with the first I/O module is not decided;

wherein, when the first I/O module is operative in the pseudo redundant configuration, the control right switcher of the first I/O module is operative to hold a control right and when the first I/O module is in a failure mode, the first I/O module is operative to transfer the control right to a new second I/O module inserted into said at least one empty slot when a failure occurs in the first I/O module; and wherein the first I/O module is operative to output a redundant state data to the second I/O module and thereby establish a redundant state between the first I/O module and the second I/O module;

making the first I/O module redundant by newly attaching a second I/O module to the empty slot when the first I/O module is required to be replaced;

controlling the transmission of normality information that indicates the state of each I/O module; and transferring a control right of the first I/O module to the second I/O module without stopping operation of the control loop.

13. The method for maintaining the instrumentation system according to claim 12, wherein the method further comprises:
  before transferring the control right of the first I/O module to the second I/O module, setting the second I/O module to have a similar function to a function of the first I/O module.

14. The method for maintaining the instrumentation system according to claim 12, wherein the method further comprises:
  masking normality information, the normality information being transmitted from the first I/O module to a host device and indicating abnormality, the host device being configured to individually set the I/O modules attached to the slots to have a redundant configuration or a single configuration.

15. The method for maintaining the instrumentation system according to claim 12, wherein the method further comprises:
  after transferring the control right of the first I/O module to the second I/O module, detaching the first I/O module from one of the slots.

16. The instrumentation system according to claim 1, wherein a number of the slots is two.

17. The method for maintaining the instrumentation system according to claim 12, wherein the number of the slots is two.

* * * * *